(12) United States Patent
Zhang et al.

(10) Patent No.: US 11,902,279 B2
(45) Date of Patent: Feb. 13, 2024

(54) METHOD, APPARATUS, SYSTEM AND STORAGE MEDIUM FOR ACCESS CONTROL POLICY CONFIGURATION

(71) Applicant: BOE TECHNOLOGY GROUP CO., LTD., Beijing (CN)

(72) Inventors: Qian Zhang, Beijing (CN); Junjie Zhao, Beijing (CN); Jing Su, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 404 days.

(21) Appl. No.: 17/268,870

(22) PCT Filed: Aug. 21, 2019

(86) PCT No.: PCT/CN2019/101760
§ 371 (c)(1),
(2) Date: Feb. 16, 2021

(87) PCT Pub. No.: WO2020/038400
PCT Pub. Date: Feb. 27, 2020

(65) Prior Publication Data
US 2021/0314322 A1    Oct. 7, 2021

(30) Foreign Application Priority Data
Aug. 22, 2018    (CN) .......................... 201810962847.6

(51) Int. Cl.
*H04L 9/40*    (2022.01)
(52) U.S. Cl.
CPC .......... *H04L 63/101* (2013.01); *H04L 63/104* (2013.01); *H04L 63/105* (2013.01); *H04L 63/20* (2013.01)

(58) Field of Classification Search
CPC ................... H04L 63/101; H04L 63/104–105
(Continued)

(56) References Cited

U.S. PATENT DOCUMENTS

| 5,335,346 A | 8/1994 | Fabbio |
| 2005/0021952 A1 | 1/2005 | Haugh |

(Continued)

FOREIGN PATENT DOCUMENTS

| CN | 101674334 A | 3/2010 |
| CN | 103065100 A | 4/2013 |

(Continued)

OTHER PUBLICATIONS

International Preliminary Report on Patentability received for PCT Patent Application No. PCT/CN2019/101760, dated Mar. 4, 2021, 9 pages (5 pages of English Translation and 4 pages of Original Document).

(Continued)

*Primary Examiner* — Anthony D Brown
(74) *Attorney, Agent, or Firm* — WOMBLE BOND DICKINSON (US) LLP (57) ABSTRACT

The present disclosure relates to a method, apparatus, system and storage medium for access control policy configuration. The method includes receiving a request for creating a target resource; determining, based on the request, whether an access control policy inheritance attribute is set for the target resource, the access control policy inheritance attribute indicating an inheritance relationship between access control policies of the target resource and its parent resource; and configuring the access control policy of the target resource according to a result of the determination. Thus, the efficiency of configuring an access control policy for a resource is improved.

20 Claims, 7 Drawing Sheets

(58) Field of Classification Search
USPC .......................................................... 726/27
See application file for complete search history.

(56) References Cited

U.S. PATENT DOCUMENTS

| | | | |
|---|---|---|---|
| 2006/0259614 A1 | 11/2006 | Patrick | |
| 2015/0180872 A1* | 6/2015 | Christner | H04L 63/10 |
| | | | 726/4 |
| 2016/0088420 A1 | 3/2016 | Kim et al. | |
| 2016/0191295 A1* | 6/2016 | Dong | G06F 16/95 |
| | | | 707/741 |
| 2018/0167397 A1 | 6/2018 | Zhang | |
| 2018/0225354 A1 | 8/2018 | Li et al. | |
| 2020/0334373 A1 | 10/2020 | Von Muhlen et al. | |

FOREIGN PATENT DOCUMENTS

| | | |
|---|---|---|
| CN | 104967620 A | 10/2015 |
| CN | 105635931 A | 6/2016 |
| CN | 106358246 A | 1/2017 |
| CN | 106656935 A | 5/2017 |
| CN | 106714075 A | 5/2017 |
| EP | 0398645 A2 | 11/1990 |
| EP | 1634137 A2 | 3/2006 |
| JP | 2016-526322 A | 9/2016 |
| JP | 2018-512674 A | 5/2018 |
| WO | 2016/070604 A1 | 5/2016 |
| WO | 2017/155162 A1 | 9/2017 |
| WO | 2018/064455 A1 | 4/2018 |

OTHER PUBLICATIONS

International Search Report and Written Opinion received for PCT Patent Application No. PCT/CN2019/101760, dated Nov. 20, 2019, 11 pages (5 pages of English Translation and 6 pages of Original Document).

Office Action received for Chinese Patent Application No. 201810962847.6, dated Nov. 25, 2021, 18 pages (9 pages of English Translation and 9 pages of Office Action).

Office Action received for Indian Patent Application No. 202147010819, dated Nov. 14, 2022, 6 pages.

OneM2M, "Study of Authorization Architecture for Supporting Heterogeneous Access Control Policies", ONEM2M, Technical Report, Document No. TR-0016-V-2.0.0, Aug. 30, 2016, 52 pages.

Supplementary European Search Report and Search Opinion received for EP Patent Application No. 19851464.8, dated Apr. 25, 2022, 8 pages.

"One M2M Functional Architecture Baseline Draft", One M2M Technical Specification, oneM2m-TS-0001-V-2014-08, Aug. 1, 2014, 7 pages.

Office Action received for Japanese Patent Application No. 2021-509188, mailed on Sep. 19, 2023, 8 pages (4 pages of English Translation and 4 pages of Original Document).

* cited by examiner

METHOD, APPARATUS, SYSTEM AND STORAGE MEDIUM FOR ACCESS CONTROL POLICY CONFIGURATION

RELATED APPLICATIONS

The present application is a 35 U.S.C. 371 national stage application of PCT International Application No. PCT/CN2019/101760, filed on Aug. 21, 2019, which claims the benefit of Chinese Patent Application No. 201810962847.6 filed on Aug. 22, 2018, the entire disclosures of which are incorporated herein as a part of the present disclosure by reference.

TECHNICAL FIELD

The present disclosure relates to the technical field of the Internet of Things (IoT), and more particularly to a method, apparatus, system and a storage medium for access control policy configuration.

BACKGROUND

In the IoT, the control of resource access is usually attribute-based, that is, resource access is controlled by setting a resource attribute. An access control policy (access-ControlPolicy) resource stores an access control policy content, that is, the content on which an evaluation on whether a request may be authorized is based. A target resource and the access control policy resource are connected through an access control policy identification (accessControlPolicyIDs) attribute in the target resource. Only if a request for accessing the target resource passes authorization verification with one or more access control policy resources indicated by the access control policy identification attribute, the operation that is requested to be authorized will be done.

In related art, a security policy may be deployed in a variety of ways. However, during deployment of an active security policy, in case that an access control policy identification attribute value is sent to a recipient while a resource is created, no intervention from an application layer would imply policy permission of a parent resource of the resource is given up. Alternatively, in case an access control policy identification attribute value is individually added for a resource that originally does not have such an access control policy identification attribute value, this would imply that the policy permission of the parent resource of the resource is given up since this resource has its own access control policy identification attribute value. This makes access control policies independent from each other between superior and subordinate resources, as well as between parent resources and child resources. In a current machine-to-machine (M2M) system, since there are many types of devices and each type of devices may have their own personalized access control policy requirements, only independent access control policy may be implemented therein.

SUMMARY

According to a first aspect of an embodiment of the present disclosure, there is provided a method for configuring an access control policy. The method comprises receiving a request for creating a target resource; determining, based on the request, whether an access control policy inheritance attribute is set for the target resource, wherein the access control policy inheritance attribute indicates an inheritance relationship between access control policies of the target resource and its parent resource; and configuring the access control policy of the target resource according to a result of the determination.

In some embodiments, the configuring the access control policy of the target resource according to a result of the determination comprises judging, based on an attribute value of the access control policy inheritance attribute, whether the target resource inherits the access control policy of its parent resource if the access control policy inheritance attribute is set for the target resource; and configuring the access control policy of the target resource according to a result of the judgement.

In some embodiments, the judging whether the target resource inherits the access control policy of its parent resource comprises determining that the target resource is to inherit the access control policy of the parent resource if the attribute value of the access control policy inheritance attribute is a first set value; determining that the target resource does not inherit the access control policy of the parent resource if the attribute value of the access control policy inheritance attribute is a second set value; and determining whether the target resource inherits the access control policy of the parent resource according to a preset setting rule if the attribute value of the access control policy inheritance attribute is a third set value.

In some embodiments, the configuring the access control policy of the target resource comprises when it is determined that the target resource is to inherit the access control policy of the parent resource, setting the access control policy identification attribute of the target resource according to the access control policy identification attribute of the parent resource; when it is determined that the target resource does not inherit the access control policy of the parent resource, determining an access control policy identification attribute for the target resource. The determining the access control policy identification attribute for the target resource comprises formulating the access control policy identification attribute for the target source, or requesting another entity to formulate the access control policy identification attribute for the target resource. The preset setting rule indicates a default inheritance relationship between the access control policies of the target resource and its parent resource. The default inheritance relationship comprises inheritance or non-inheritance.

In some embodiments, the method further comprise determining, based on the request, whether a personalized access control policy identification attribute value is set for the target resource; and if the personalized access control policy identification attribute value is set for the target resource, adding the personalized access control policy identification attribute value to the access control policy identification attribute of the target source.

In some embodiments, the method further comprises, when the target resource has been created and the attribute value of its access control policy inheritance attribute indicates that the target resource is to inherit the access control policy of the parent resource, updating the access control policy identification attribute of the target resource according to a changed access control policy identification attribute of the parent resource in response to detection of a change in the access control policy identification attribute of the parent resource.

In some embodiments, the request is in a form of resource creation message. The method comprises extracting the attribute value of the access control policy inheritance attribute from the resource creation message, or extracting the attribute value of the access control policy inheritance attribute and the personalized access control policy identification attribute value from the resource creation message.

In some embodiments, the method further comprises, if no access control policy inheritance attribute is set for the target resource, configuring the access control policy of the target resource based on a default policy configuration rule.

According to a second aspect of an embodiment of the present disclosure, there is provided a method for configuring an access control policy. The method comprises determining an inheritance relationship between access control policies of a target resource and its parent resource; sending a request for creating the target resource, the request being set therein with an access control policy inheritance attribute indicating the inheritance relationship, for use in configuration of the access control policy of the target resource; and receiving a resource creation response to the request.

According to a third aspect of an embodiment of the present disclosure, there is provided an apparatus for configuring an access control policy. The apparatus comprises a receiver arranged to receive a request for creating a target resource; an attribute determiner arranged to determine, based on the request, whether an access control policy inheritance attribute is set for the target resource, the access control policy inheritance attribute indicating an inheritance relationship between access control policies of the target resource and its parent resource; and a policy configurator arranged to configure the access control policy of the target resource according to a result of the determination.

In some embodiments, the policy configurator comprises an inheritance judger arranged to, in response to the access control policy inheritance attribute being set for the target resource, judge whether the target resource inherits the access control policy of its parent resource based on the attribute value of the access control policy inheritance attribute; and a policy setter configured to set the access control policy of the target resource according to a result of the judgement.

In some embodiments, the inheritance judger is arranged to decide that the target resource is to inherit the access control policy of the parent resource when the attribute value of the access control policy inheritance attribute is a first set value, decide that the target resource does not inherit the access control policy of the parent resource when the attribute value of the access control policy inheritance attribute is a second set value, and decide whether the target resource inherits the access control policy of the parent resource according to a preset setting rule when the attribute value of the access control policy inheritance attribute is a third set value.

In some embodiments, the policy setter is arranged to set an access control policy identification attribute of the target resource according to an access control policy identification attribute of the parent resource when it is decided that the target resource is to inherit the access control policy of the parent resource; determine an access control policy identification attribute for the target resource when it is decided that the target resource does not inherit the access control policy of the parent resource. The determining the access control policy identification attribute for the target resource comprises formulating the access control policy identification attribute for the target source, or requesting another entity to formulate the access control policy identification attribute for the target resource. The preset setting rule indicates a default inheritance relationship between the access control policies of the target resource and its parent resource. The default inheritance relationship comprises inheritance or non-inheritance.

In some embodiments, the attribute determiner is arranged to determine, based on the request, whether a personalized access control policy identification attribute value is set for the target resource; and the policy setter is arranged to add the personalized access control policy identification attribute to the access control policy identification attribute of the target source in response to the personalized access control policy identification attribute value being set for the target resource.

In some embodiments, the policy configurator further comprises a policy updater arranged to, when the target resource is created and the attribute value of its access control policy inheritance attribute indicates that the target resource is to inherit the access control policy of the parent resource, update the access control policy identification attribute of the target resource according to a changed access control policy identification attribute of the parent resource in response to detection of a change in the access control policy identification attribute of the parent resource.

In some embodiments, the request is in a form of resource creation message. The attribute determiner is arranged to extract the attribute value of the access control policy inheritance attribute from the resource creation message, or extract the attribute value of the access control policy inheritance attribute and the personalized access control policy identification attribute value from the resource creation message.

In some embodiments, the policy setter is arranged to, in response to no access control policy inheritance attribute being set for the target resource, configure the access control policy of the target resource based on a default policy configuration rule.

According to a fourth aspect of an embodiment of the present disclosure, there is provided an apparatus for configuring an access control policy. The apparatus comprises a determiner arranged to determine an inheritance relationship between access control policies of a target resource and its parent resource; a sender arranged to send a request for creating the target resource, the request being set therein an access control policy inheritance attribute indicating the inheritance relationship, for use in configuration of the access control policy of the target resource; and a receiver arranged to receive a resource creation response to the request.

According to a fifth aspect of an embodiment of the present disclosure, there is provided a computing device for configuring an access control policy. The computing device comprises a memory configured to store executable instructions; and a processor coupled to the memory and configured to run the executable instructions to perform the method according to an embodiment of the present disclosure as described above.

According to a sixth aspect of an embodiment of the present disclosure, there is provided a computer-readable storage medium. The computer-readable storage medium stores computer program instructions that, when executed by one or more processors, causes the processor to perform the method according to an embodiment of the present disclosure as described above.

According to a seventh aspect of an embodiment of the present disclosure, there is provided a system for configuring an access control policy. The system comprises a first entity used to send a request for creating a target resource; and a second entity comprising the apparatus according to the third aspect of the embodiment of the present disclosure.

In some embodiments, the first entity comprises an application entity, and the second entity comprises a common services entity.

In some embodiments, the first entity comprises the apparatus according to the fourth aspect of the embodiment of the present disclosure.

BRIEF DESCRIPTION OF DRAWINGS

The above and other features and advantages of the present disclosure will become more obvious after the embodiments are described in detail with reference to the drawings.

DETAILED DESCRIPTION

In the following description, for purposes of explanation instead of limitation, certain specific details of the disclosed embodiments, such as infrastructures, interfaces, technologies, and the like are set forth in order to clearly and thoroughly understand the present disclosure. However, those skilled in the art should readily understand that the present disclosure may be implemented according to other embodiments that do not accurately conform to the details described herein without severely departing from the spirit and scope of the present disclosure. In addition, in this context, for the sake of simplicity and clarity, detailed description of familiar devices, circuits, and methods are omitted to avoid redundant details and possible confusion.

In addition, unless otherwise specified, "first" and/or "second", etc., are not intended to imply temporal aspects, spatial aspects, ordering, etc. Instead, such terms are used only as identifiers, names, etc. for features, units, items, etc. For example, the first object and the second object generally correspond to an object A and an object B, or two different or two identical objects, or the same object.

The IoT comprises a perception layer, a network layer and an application layer. The perception layer is composed of various sensors, including sensing terminals such as infrared sensors, electronic labels, card readers, and inducers. The perception layer is a source in the IoT that functions to identify objects and collect information. The network layer is composed of various networks, including an Internet, a broadcasting network, a network management system, a cloud computing platform, etc., which is responsible for transmitting and processing information obtained by the perception layer. The application layer is the interface between the IoT and users, and is combined with industry needs to achieve intelligent application of the IoT. On the application layer corresponding to the M2M architecture, an Application Entity (AE) in each device and sensor provides a standardized interface for managing applications and interacting with applications. On the service layer between the application layer and the network layer, a Common Services Entity (CSE) supports resource sharing and interoperability. In the IoT, an access control policy is already deployed in a security layer. The access control policy comprises, for example, restricting known blacklist users, releasing/restricting internal big data analysis hosts, releasing/restricting local permission of a special organization, and deploying permission of regional prevention and control. In the existing access control policy configuration scheme, access control policy content is stored in an access control policy resource. The access control policy comprises attribute permissions that represent a set of access control rules. There may be provided several access control policy resources. Each access control policy resource is provided with a corresponding identifier.

The access control policy resource may be configured under a root resource. An access control policy identification attribute may be set in the target resource under the root resource. The attribute value of the access control policy identification attribute may comprise a list of identifiers of the access control policy. The list comprises at least one access control policy identifier. The target resource and the access control policy resource are connected through the access control policy identification attribute value.

A request for accessing a target resource is required to pass authorization verification of the access control policy resource corresponding to one or more identifiers in the list of identifiers of access control policies in the access control policy identification attribute thereof before a respective operation is authorized to be done. If there is no access control policy identification attribute in the target resource, authorization evaluation is performed based on the access control policy identification attribute corresponding to the access control policy identification attribute value of its parent resource, or based on requestor-related content in a local policy.

The existing access control policy configuration scheme has serious loopholes: 1. as an initiator, once it sends an access control policy identification attribute value to a recipient through an active security policy deployment, e.g., as one of the attribute values while, e.g., a resource is created, this means that the policy permission of the parent resource is given up in case of no intervention from the application layer; 2. the resource follows the access control policy of the parent resource when there is initially no access control policy identification attribute value, but if an access control policy identification attribute value is individually added for the resource, it means the policy permission of the parent resource is abandoned.

Explanation will be made by taking a scenario of a large-scale IoT device management as an example. The large-scale IoT device management platform has a large number of registered devices and a large amount of access and interaction data. In this scenario, an existing access control policy configuration method is to independently deploy and configure an access control policy of a resource, that is, each user is independently configured with its own access control policy. In other words, an independent access control policy is adopted in the related art, i.e., the superior and subordinate resources, and parent and child resources are independent from each other.

However, in this scenario, users of the platform are divided into respective levels and there may be an inclusion relationship therebetween. For example, in a high-level confidential organization, users are divided into different levels of confidentiality in order for management of device information. The higher a level of confidentiality is, the more information a user can see. If an independent access control policy is adopted in this case, it may cause some problems. For example, the global access control policy information of a large-scale IoT device management platform should belong to confidential information and should not be known to ordinary users, because such access control policy information that may be used by any resource under the platform. Moreover, since there is a large amount of global access control policy information, it is unfeasible for users to obtain all of them. It is unfeasible for most IoT devices with low computing power to obtain and re-assemble global access control policy information to generate a new set of access control policies. Hence, the existing independent access control policy configuration method restricts reflection of user's intentions in terms of access security control.

Figure 1:
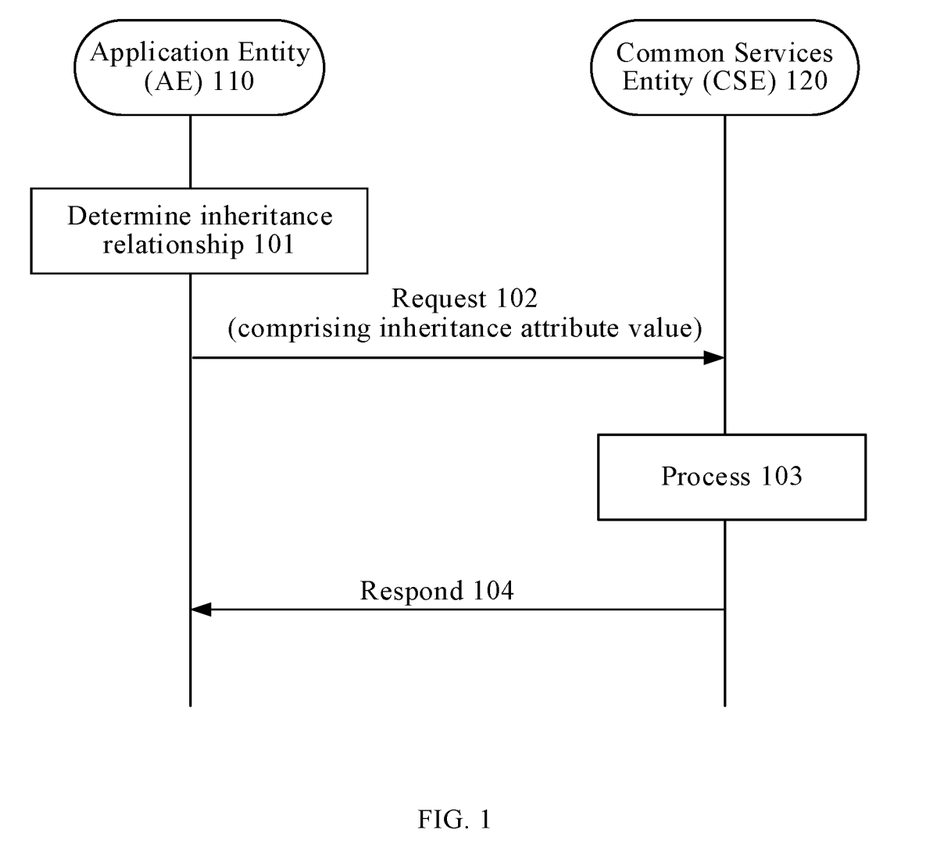
FIG. 1 is a schematic view of an environment in which an embodiment of the present disclosure is applicable.

FIG. 1 shows a schematic view of an environment to which an embodiment of the present disclosure is applicable. As shown in FIG. 1, the environment may comprise an initiator 110 and a CSE 120. The initiator 110 may be an AE.

The initiator 110 may first determine an inheritance relationship 101 between the access control policies of the target resource and its parent resource. The target resource is a resource that the initiator 110 intends to create. Thereafter, the initiator 110 sends a request 102 for creating the target resource to the CSE 120. The request is provided therein with an access control policy inheritance attribute indicating the inheritance relationship so as to configure the access control policy of the target resource. Resources may comprise those resources used for CSEs, AEs in various devices and sensors, containers, software, etc. The resource creation requests 102 may comprise an attribute value related to the attribute of the resource to be created. The attribute value may comprise the access control policy inheritance attribute value.

The CSE 120 processes 103 the received resource creation request. The CSE 120 may analyze the resource creation request, and extract an attribute value from the request to create the resource accordingly. In some embodiments, when the access control policy inheritance attribute value is extracted from the request, the CSE 120 may accordingly set the access control policy identification attribute of the resource according to the extracted access control policy inheritance attribute value during creation of the resource.

The CSE 120 sends a resource creation response 104 to the initiator 110 after completion of resource creation. Optionally, the resource creation response 104 comprises details of resource creation. The initiator 110 receives the resource creation response 104 for the request. Optionally, the initiator 110 may locally store the details included in the resource creation response 104.

According to an embodiment of the present disclosure, the access control policy inheritance attribute may be provided by an entity that intends to create a target resource. The CSE may configure an access control policy of the target resource according to the access control policy inheritance attribute in a current request. This makes it possible to flexibly configure different access control policies, or an access control policy that an initiator desires according to different requests.

Figure 2:
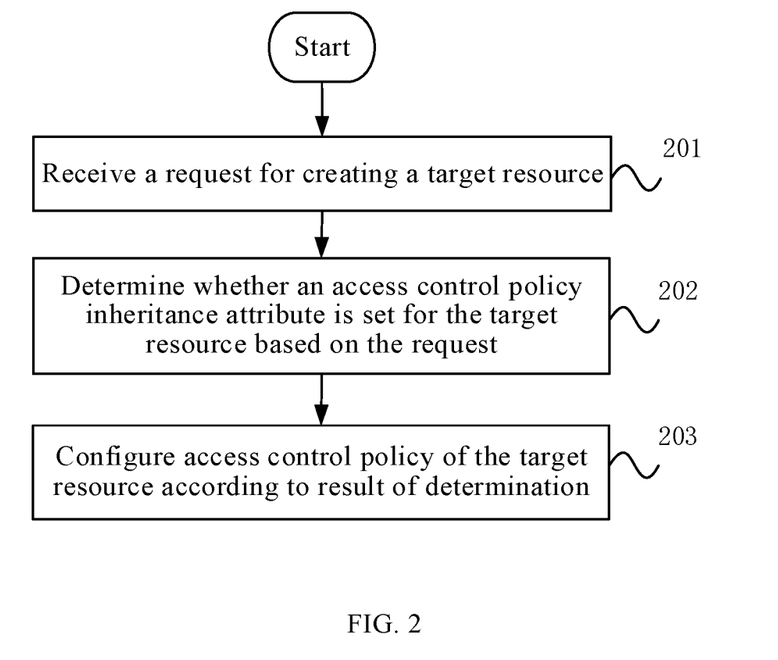
FIG. 2 is a schematic flowchart of an embodiment of a method of the present disclosure.

FIG. 2 shows a schematic flowchart of an embodiment of an access control policy configuration method of the present disclosure. The access control policy configuration method may be implemented by a CSE.

In step 201, a request for creating a target resource is received. The request may be received from an AE.

In step 202, it is determined whether an access control policy inheritance attribute is set for the target resource based on the request. The access control policy inheritance attribute indicates an inheritance relationship between access control policies of the target resource and its parent resource. This inheritance relationship may be either inheritance or no-inheritance. It can be understood that, in general, inheritance is the mechanism of basing an object upon another object, retaining similar implementation. As used herein, that a resource A "inherits" the access control policy of a resource B means that the resource A is a child resource of the resource B, the resource B is the parent resource of the resource A, and "inheritance" may allow the child resource A to acquire various access control policies of the parent resource B.

In a specific implementation, since the entities represented by the resources are different, the parent-child relationship between the resources may have many forms. In an example, the parent resource may be a black box installed on a car, and the child resource thereof may be a fault code recording device, a fuel consumption recording device, etc. installed in the black box. In another example, the parent resource may be an air conditioner installed indoors, and the child resource thereof may be a temperature sensor, a humidity sensor, etc. installed in the air conditioner. In a tree-shaped topology structure diagram of devices or resources, the parent resource corresponds to a parent node, and the child resource corresponds to the child node(s) of the parent node.

In some embodiments, the determination is made by searching the user's indicator about the inheritance relationship in the request. When the request comprises the indicator about the inheritance relationship, it is determined that an access control policy inheritance attribute is set for the target resource. The indicator may be the attribute value of the access control policy inheritance attribute specified by the user.

In step 203, the access control policy of the target resource is configured according to the determination result. The configured access control policy will be employed to control subsequent access to the target resource. In some embodiments, the determination result may indicate that an access control policy inheritance attribute is set for the target resource, which means that the target resource is to inherit the access control policy of its parent resource (if any). Thus, the access control policy of the target resource may be configured according to the access control policy of the parent resource. The determination result may alternatively indicate that the access control policy inheritance attribute is not set for the target resource. In some embodiments, this may implies that the initiator does not support setting of the access control policy inheritance attribute. At this time, the access control policy of the target resource may be configured according to a default policy configuration rule in the related art, so as to be backward compatible with such legacy initiators.

According to the method provided by the embodiment of the present disclosure, whether to inherit the access policy permission of the parent resource may be determined according to the access control policy inheritance attribute, so that an access control policy of a child resource may be efficiently set and changed. Moreover, since the access control policy may be configured and modified according to the user's indicator about the inheritance relationship, the access control policy may be flexibly configured according to the user's wishes, thereby improving user experience.

Figure 3:
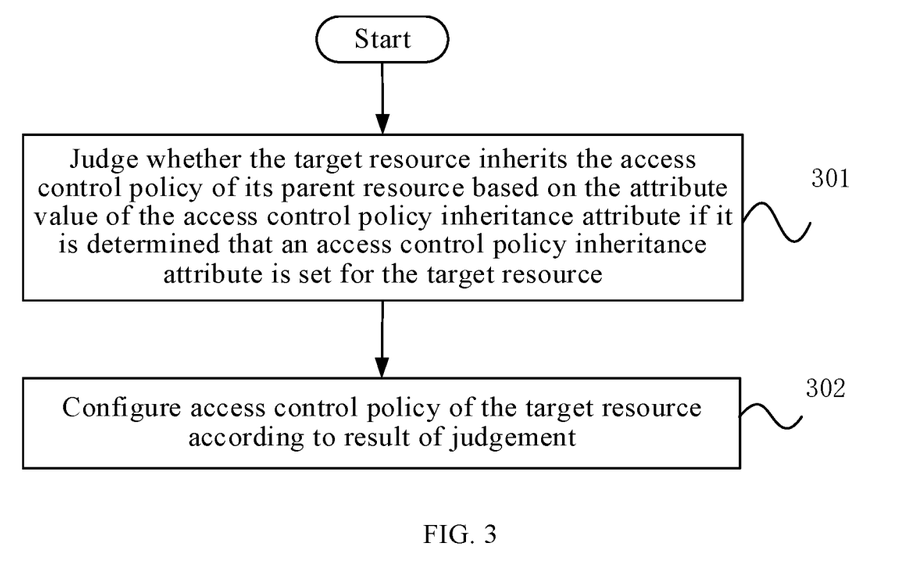
FIG. 3 is a schematic flowchart of a further embodiment of a method of the present disclosure.

FIG. 3 shows a schematic flowchart of configuring an access control policy in an embodiment of the present disclosure.

In step 301, if it is determined that an access control policy inheritance attribute is set for the target resource, whether the target resource inherits the access control policy of its parent resource is judged based on the attribute value of the access control policy inheritance attribute. Exemplarily, the attribute value of the access control policy inheritance attribute may have a first set value indicating "inheritance" and a second set value indicating "non-inheritance". Optionally, the attribute value of the access control policy inheritance attribute may also have a third set value, indicating that any inheritance relationship may be acceptable.

In step 302, the access control policy of the target resource is configured according to the judging result. The attribute value of the access control policy inheritance attribute may indicate an intention of an initiator of the request in term of access control of the target resource and an intention in term of the inheritance relationship between the access control policies of the target resource and its parent resource. With the attribute value, it allows to determine whether the access control policy permission of its parent resource is to be inherited, or other (including default) access control policies are desired to be used.

In an embodiment, if the attribute value of the access control policy inheritance attribute is the first set value, it is determined that the target resource inherits the access control policy of the parent resource. If the attribute value of the access control policy inheritance attribute is the second set value, it is determined that the target resource does not inherit the access control policy of the parent resource. If the attribute value of the access control policy inheritance attribute is the third set value, it is determined that the access control policy may be configured in accordance with a preset configuration rule. The preset configuration rule may indicate a default inheritance relationship between the access control policies of the target resource and its parent resource. The default inheritance relationship comprises either inheritance or non-inheritance.

The first set value, the second set value, and the third set value may be appropriately assigned. For example, the first set value may be 1, the second set value may be 0, and the third set value may be a null value. Therefore, when the attribute value is 1, it indicates that the target resource intends to inherit the access control policy of its parent resource, so the access control policy identification attribute of the target resource is set according to the access control policy identification attribute of the parent resource. When the attribute value is 0, it indicates that the target resource does not inherit the access control policy of its parent resource. At this time, a request may be made in order to formulate an access control policy identification attribute for the target resource. Exemplarily, a first entity located at the request initiator may be requested to formulate it. Alternatively, the CSE may formulate it by itself. The formulation of the access control policy identification attribute may be done by the application layer of an entity. When the attribute value is null, the access control policy identification attribute of the target resource may be set according to a default inheritance relationship indicated by a preset configuration rule or an access control policy identification attribute of the parent source, or the application layer may be requested to formulate the access control policy identification attribute of the target resource.

According to the embodiment of the present disclosure, since setting of the access control policy inheritance attribute carried in the request is simple (for example, it may be 0, 1, null), the solution of the embodiment of the present disclosure is applicable to not only non-lightweight devices (such as mobile phones), but also lightweight devices with single logic, with no or little computing capability. For example, a thermometer device is a single logic device, and setting of an access control policy inheritance attribute value according to the embodiment of the present disclosure is simple and fixed for the thermometer device.

The access control policy identification attribute value may comprise a list of identifiers of access control policies. Each list of identifiers comprises an identifier of at least one access control policy. In some embodiments, setting the access control policy identification attribute of the target resource according to the access control policy identification attribute of the parent resource comprises copying the list of identifiers of access control policy of the parent resource into the access control policy identification attribute of the target resource.

Figure 4:
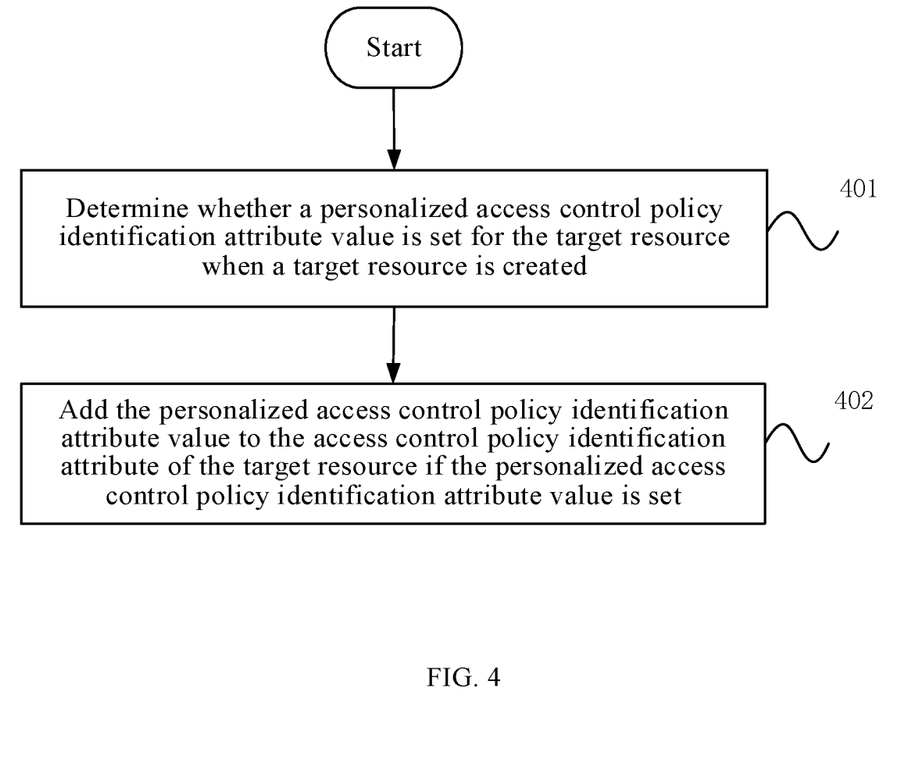
FIG. 4 is a schematic flowchart of a still further embodiment of a method of the present disclosure.

FIG. 4 shows a schematic flowchart of configuring an access control policy in a further embodiment of the present disclosure.

In step 401, when a target resource is created, it is determined whether a personalized access control policy identification attribute value is set for the target resource. The personalized access control policy identification attribute value may comprise a list of identifiers of personalized access control policies that the user desires to adopt. In some embodiments, when a request for creating a target resource in a message comprises an access control policy identification attribute value, the attribute value may be regarded as a personalized access control policy identification attribute value.

In step 402, if the personalized access control policy identification attribute value is set, the personalized access control policy identification attribute value is added to the access control policy identification attribute of the target resource.

In an embodiment, when the attribute value of the access control policy inheritance attribute set for the target resource is 1 and no personalized access control policy identification attribute value is set for the target resource upon creation of the target resource, the CSE copies the attribute value of the access control policy identification attribute of the parent resource into the target resource as the access control policy identification attribute of the target resource. The attribute value of the access control policy identification attribute of the parent resource comprises a list of identifiers of one or more access control policies adopted by the parent resource.

If the attribute value of the access control policy inheritance attribute set for the target resource is 1 and there is a personalized access control policy identification attribute value set for the target resource, the CSE adds the attribute value of the personalized access control policy identification attribute to the target resource as the access control policy identification attribute of the target resource, meanwhile it copies the access control policy identification attribute value of the parent resource to the target resource. In this way, the access control policy identification attribute of the target resource comprises both the access control policy identification attribute value of the parent resource and the personalized access control policy identification attribute value.

In a further embodiment, when the attribute value of the access control policy inheritance attribute set for the target resource is 0 and no personalized access control policy identification attribute value is set for the target resource upon creation of the target resource, the CSE requests from the application layer an access control policy identifier for the target resource. The CSE adds a list of identifiers of the access control policy formulated by the application layer to the target resource as the access control policy identification attribute value of the target resource.

If the attribute value of the access control policy inheritance attribute set for the target resource is 0 and there is a personalized access control policy identification attribute value set for the target resource, the CSE adds the personalized access control policy identification attribute value to the target resource as the access control policy identification attribute of the target resource, meanwhile it copies an access control policy identifier(s) formulated by the application layer to the target resource. In this way, the access control policy identification attribute of the target resource comprises both a list of identifiers of the access control policies formulated by the application layer and a list of identifiers of personalized access control policies that the user desires to adopt.

In an embodiment, the request is in a form of resource creation message, wherein the resource creation message carries an attribute value of the access control policy inheritance attribute. Alternatively, the resource creation request may simultaneously carry an attribute value of the access control policy inheritance attribute and a personalized access control policy identification attribute value. The CSE may configure an access control policy of a resource according to the information related to the access control policy inheritance attribute of the resource in the resource creation message.

Additionally, the CSE may further accordingly update the access control policy inheritance attribute of the target resource according to an attribute value of the access control policy inheritance attribute included in other requests for operating resources, such as an updating resource request, and update the access control policy of the target resource according to the inheritance relationship indicated by the attribute value.

Figure 5:
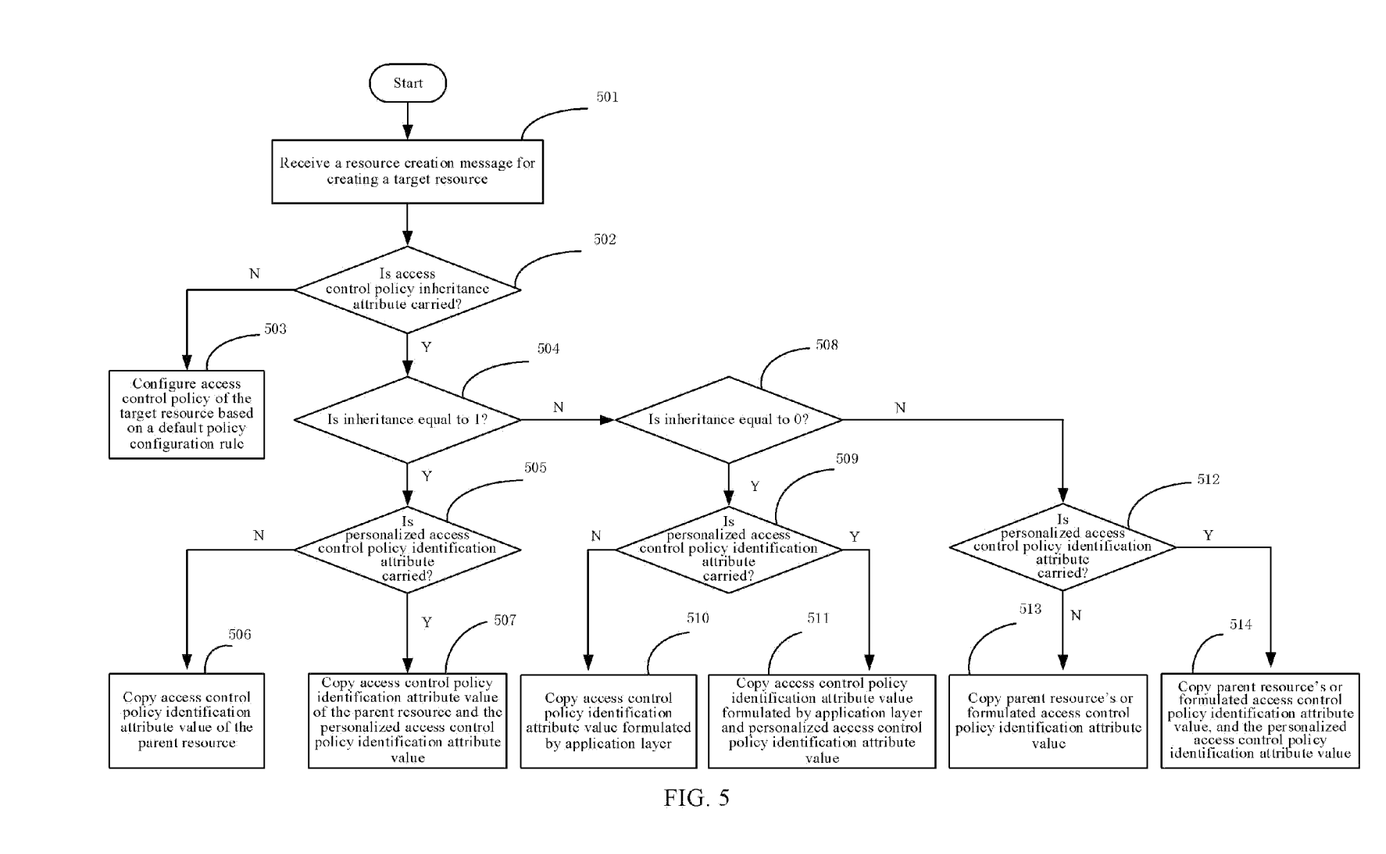
FIG. 5 is a schematic flowchart of a still further embodiment of a method of the present disclosure.

FIG. 5 shows a schematic flowchart of a further embodiment of an access control policy configuration method of the present disclosure.

In step 501, a resource creation message for creating a target resource is received.

In step 502, it is judged whether the resource creation message carries attribute information of an access control policy inheritance attribute. If yes, go to step 504; if no, go to step 503. Exemplarily, an inheritance field may be set in the resource creation message to contain the attribute information of the access control policy inheritance attribute. The value of the inheritance field is the attribute value of the access control policy inheritance attribute.

In step 503, if the resource creation message does not carry the attribute information of the access control policy inheritance attribute (for example, the resource creation message does not contain the inheritance field), then the access control policy of the target resource is configured based on the default policy configuration rule. The default policy configuration rule may be an access control policy configuration rule currently adopted in the related art, for example, an independent access control policy rule. Alternatively, the default policy configuration rule may be other policy configuration rule set by a Hosting CSE of the target resource. For example, the default policy configuration rule may be made in such a way that the access control policy identification attribute value of the parent resource of the target resource is copied into the target resource as the access control policy identification attribute of the target resource.

In step 504, if the resource creation message carries the attribute information of the access control policy inheritance attribute, it is judged whether the attribute value (e.g., the value of inheritance field) of the access control policy inheritance attribute is 1. If yes, go to step 505; and if no, go to step 508.

If an initiator desires to make a new resource inherit the access control policy of the parent resource thereof when creating the resource, it may set the attribute value of the access control policy inheritance attribute to 1. Exemplarily, in case of no active defense to be adopted, the attribute value of the access control policy inheritance attribute may be set to 1, and the resource creation message does not carry the personalized access control policy identification attribute value set for the target resource. In case of active defense to be adopted, in addition to the attribute value of the access control policy inheritance attribute being set to 1, the content of the resource creation message also carries a personalized access control policy identification attribute value set for the target resource.

In step 505, when the attribute value of the access control policy inheritance attribute is 1, it is further judged whether the resource creation message carries the personalized access control policy identification attribute value.

In step 506, when the resource creation message does not carry the personalized access control policy identification attribute value, the access control policy identification attribute value of the parent resource is copied into a newly created target resource.

In step 507, when the resource creation message carries the personalized access control policy identification attribute value, in addition to copying the access control policy identification attribute value of the parent resource to the newly created target resource, the personalized access control policy identification attribute value is copied to the newly created target resource.

In step 508, it is judged whether the attribute value of the access control policy inheritance attribute is 0. If yes, go to step 509; and if no, go to step 512.

If an initiator desires to make the resource not to inherit the access control policy of the parent resource thereof upon creation of a new resource, the attribute value of the access control policy inheritance attribute is set to 0. In case of no active defense to be adopted, the attribute value of the access control policy inheritance attribute is set to 0, and the content of the resource creation message does not carry the personalized access control policy identification attribute value set for the target resource. In case of active defense to be adopted, the attribute value of the access control policy inheritance attribute is set to 0, and the content of the resource creation message carries the personalized access control policy identification attribute value set for the target resource.

In step 509, it is judged whether the creation message carries the personalized access control policy identification attribute value. If yes, go to step 510; and if no, go to step 511.

In step 510, when the resource creation message does not carry the personalized access control policy identification attribute value, an access control policy identification attribute value formulated by the application layer is copied to the newly created target resource.

If the attribute value of the access control policy inheritance attribute is set to 0, and creation of resource is permitted, the Hosting CSE will request the application layer to formulate a relevant access control policy for the target resource.

In step 511, when the resource creation message carries the personalized access control policy identification attribute value, in addition to copying the access control policy identification attribute value formulated by the application layer to the newly created target resource, the personalized access control policy identification attribute value is copied to the newly created target resource, that is, the personalized access control policy identification attribute value in the creation message is added to the access control policy identification attribute value of the target resource. The access control policy identification attribute value may be a list of identifiers of access control policies.

In step 512, in the case where the attribute value of the access control policy inheritance attribute is not set to 1 or 0, that is, the attribute value is null, it is judged whether the creation message carries a personalized access control policy identification attribute value. If no, go to step 513; and if yes, go to step 514.

In some embodiments, if the attribute value of the access control policy inheritance attribute is set to null, it represents: first, the initiator may be a lightweight IoT device; and second, the initiator does not know whether it should inherit the access control policy of the parent resource. At this time, the Hosting CSE may set an inheritance relationship for the created resource according to a preset setting rule, that is, assign an attribute value (1, 0, null) of the access control policy inheritance attribute to the created resource according to a default inheritance relationship and configures the access control policy based on the assigned attribute value accordingly.

In step 513, the Hosting CSE copies the access control policy identification attribute value of the parent resource or the access control policy identification attribute value formulated by the application layer to the newly created target resource.

In step 514, the Hosting CSE copies the access control policy identification attribute value of the parent resource or the access control policy identification attribute value formulated by the application layer to the newly created target resource, and meanwhile copies the personalized access control policy identification attribute value to the newly created target resource.

In an embodiment, for any child resource of which an attribute value of an access control policy inheritance attribute is a first set value such that it inherits of an access control policy of its parent resource, the access control policy thereof will vary with the access control policy of the parent resource. For example, if an access control policy identification, such as an identifier of the access control policy, is newly added to, modified in, or deleted from the access control policy identification attribute of an parent resource, the access control policy identification is correspondingly newly added to, modified in or deleted from the access control policy identification attribute of the child resource. It can be understood that the addition, modification, and deletion of the access control policy identification may result in an iterative reaction, that is, a change of the parent access control policy identification attribute always results in a change of the child access control policy identification attribute. Exemplarily, suppose that there are three resources R1, R2, and R3, and there is a first parent-child relationship between the resources R1 and R2, and a second parent-child relationship between the resources R2 and R3. When an access control policy identification included in an access control policy identification attribute of the resource R1 (the parent resource in the first parent-child relationship) changes, the access control policy identification included in the access control policy identification attribute of the resource R2 (the child resource in the first parent-child relationship) changes accordingly. Since the resource R2 acts as a parent resource in the second parent-child relationship, the change of the access control policy identification included in the access control policy identification attribute of the resource R2 also leads to the change of the access control policy identification included in the access control policy identification attribute of the resource R3 (the child resource in the second parent-child relationship).

Figure 6:
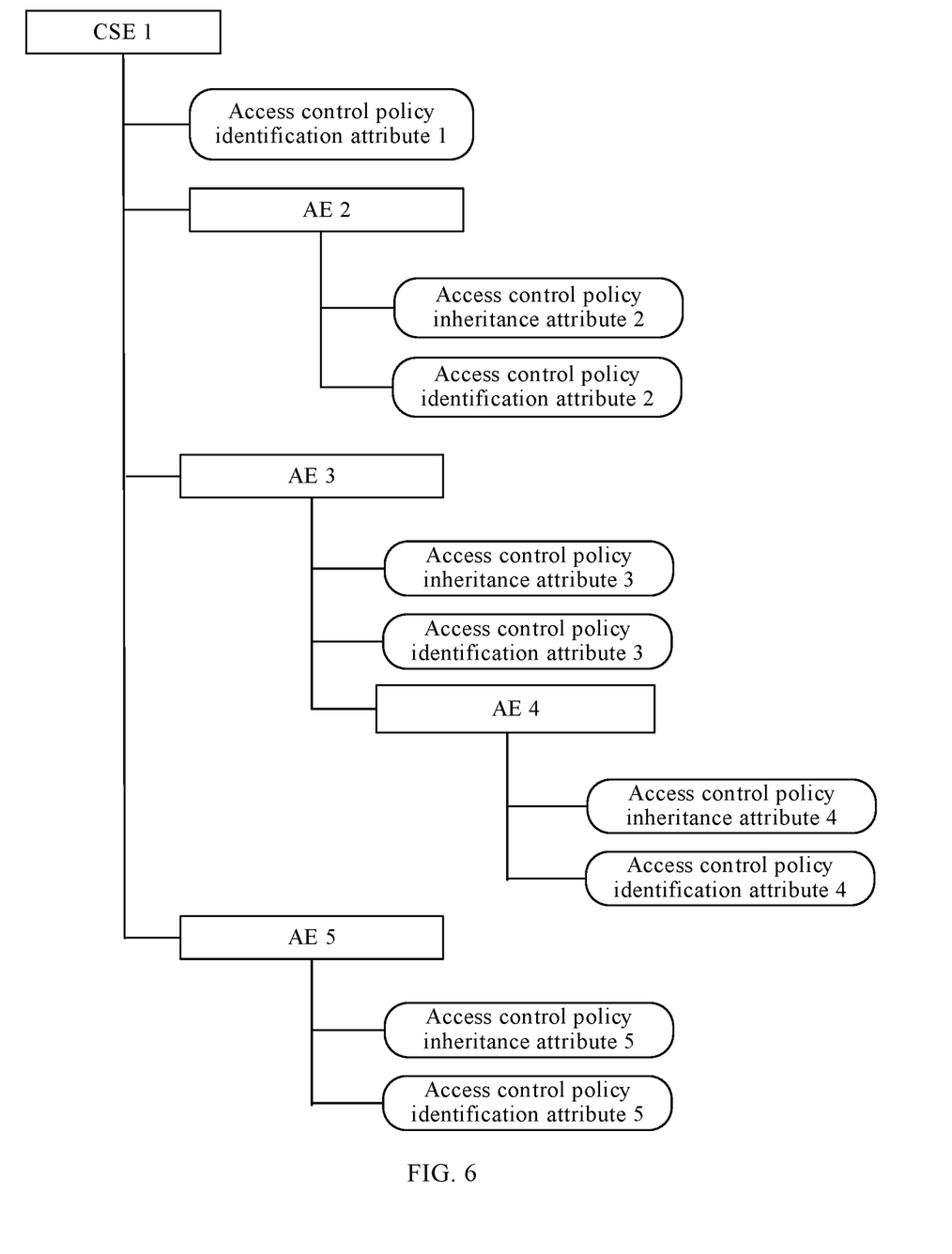
FIG. 6 is a schematic view of a tree structure of a parent resource and child resources.

FIG. 6 shows a schematic diagram of a tree structure of a parent resource and child resources and attributes set for a parent resource and child resources. As shown in FIG. 6, in the resource tree, the CSE 1 is the root node, and provided with an access control policy identification attribute 1. The attribute value of the access control policy identification attribute 1 is a list 1 of identifiers of access control policies. The list 1 may be exemplified as {ACP_1, ACP_2, ACP_3}. The CSE 1 may have multiple child nodes, which are, for example, an AE 2, an AE 3, and an AE 5.

The AE 2 is provided with an access control policy inheritance attribute 2 and an access control policy identification attribute 2. The value of the access control policy inheritance attribute 2 is exemplified as 1, indicating that the AE 2 is to inherit the access control policy of its parent resource (i.e., the CSE 1). The attribute value of the access control policy identification attribute 2 is a list 2 of identifiers of access control policies associated with the AE 2. The list 2 is exemplified as {ACP_1, ACP_2, ACP_3}, which is consistent with the list 1 of identifiers of the access control policy of the CSE 1.

The AE 3 is provided with an access control policy inheritance attribute 3 and an access control policy identification attribute 3. The value of the access control policy inheritance attribute 3 is exemplified as 1, indicating that the AE 3 is to inherit the access control policy of its parent resource (i.e., the CSE 1). The attribute value of the access control policy identification attribute 3 is a list 3 of identifiers of access control policies associated with the AE 3. The list 3 may be exemplified as {ACP_1, ACP_2, ACP_3}.

The AE 5 is provided with an access control policy inheritance attribute 5 and an access control policy identification attribute 5. The value of the access control policy inheritance attribute 5 is exemplified as 0, indicating that the AE 5 does not inherit the access control policy of its parent resource (i.e., the CSE 1). The attribute value of the access control policy identification attribute 5 is a list 5 of identifiers of access control policies associated with the AE 5. The list 5 is exemplified as {ACP_1, ACP_5}, which is different from the list 1 of identifiers of the access control policy of the CSE 1.

The AE 3 has a child node, which is AE 4. The AE 4 is provided with an access control policy inheritance attribute 4 and an access control policy identification attribute 4. The value of the access control policy inheritance attribute 4 is exemplified as 1, indicating that the AE 4 is to inherit the access control policy of its parent resource (i.e., the AE 3). The attribute value of the access control policy identification attribute 4 is a list of identifiers 4 of access control policies associated with the AE 4. The list 4 is exemplified as {ACP_1, ACP_2, ACP_3, ACP_6}, where ACP_1, ACP_2, ACP_3 are consistent with the list 3 of identifiers of the access control policy of the AE 3, and in turn the list 1 of identifiers of the access control policy of the CSE 1, and ACP_6 may be a personalized access control policy identifier of the AE4 itself.

An exemplary application scenario of an embodiment of the present disclosure will be explained with reference to FIG. 6 by way of example. In this application scenario, suppose that a suspected attacker A is acquiring IoT data (for example, data of AEs 2-5) by using a crawler. In order to secure the data, the resources of all AEs need to be temporarily protected. At this time, an access control policy B may be established for the user A. The content of the access control policy B may be that all resource acquisition requests initiated by the user A will be shielded. To this end, an identifier ACP_4 of the access control policy B may be added to the access control policy identification attribute 1 of the CSE 1, and thus, the list 1 is modified to {ACP_1, ACP_2, ACP_3, ACP_4}.

Since the attribute values of the access control policy inheritance attributes of the AE 2, AE 3 and its descendent AE 4 are all 1, indicating that the access control policies of their parent resource are to be inherited, the access control policy identification attributes of these AEs are all updated accordingly according to the CSE 1, that is, the identifier ACP_4 of the access control policy B for the user A is added to the attribute values of those access control policy identification attributes. Thus, both list 2 and list 3 are automatically updated to {ACP_1, ACP_2, ACP_3, ACP_4}, and the list 4 is automatically updated to {ACP_1, ACP_2, ACP_3, ACP_4, ACP_6}.

Since the attribute value of the access control policy inheritance attribute of the AE 5 is 0, indicating that the access control policy of its parent resource is not inherited, the access control policy identification attribute 5 is not updated, and the list 5 remains unchanged as {ACP_1, ACP_5}. In some embodiments, in order to protect the data of the AE 5, ACP_4 may also be added to the list 5 manually.

In some embodiments, if the CSE 1 deletes the access control policy identifier ACP_3 from the attribute value of its access control policy identification attribute 1, then the list 1 is modified to {ACP_1, ACP_2}. At this time, the access control policy identification attributes of the AE 2, AE 3 and its descendant AE 4 that have the attribute value of the access control policy inheritance attribute of 1 are all updated accordingly, that is, the access control policy identifier ACP_3 is deleted from those identification attribute values. Thus, the list 2, list 3, and list 4 are automatically modified to {ACP_1, ACP_2}, {ACP_1, ACP_2}, and {ACP_1, ACP_2, ACP_6}.

Since the attribute value of the access control policy inheritance attribute of the AE 5 is 0, indicating that the access control policy of its parent resource is not inherited, the access control policy identification attribute 5 is not updated, and the list 5 remains unchanged as {ACP_1, ACP_5}.

According to the embodiments of the present disclosure, no matter how diverse resources are, the modification of access control policies will be very efficient as long as they have an inheritance attribute. In particular, in some emergency situations where the access control policies of all the resources need to be modified, this may possibly done by simply deploying the access control policy of a root node of a resource tree and modifying the access control policies of resources that do not have inheritance attributes to achieve this. This greatly reduces the user's workload of modification and guarantees work efficiency and emergency response speed.

Figure 7:
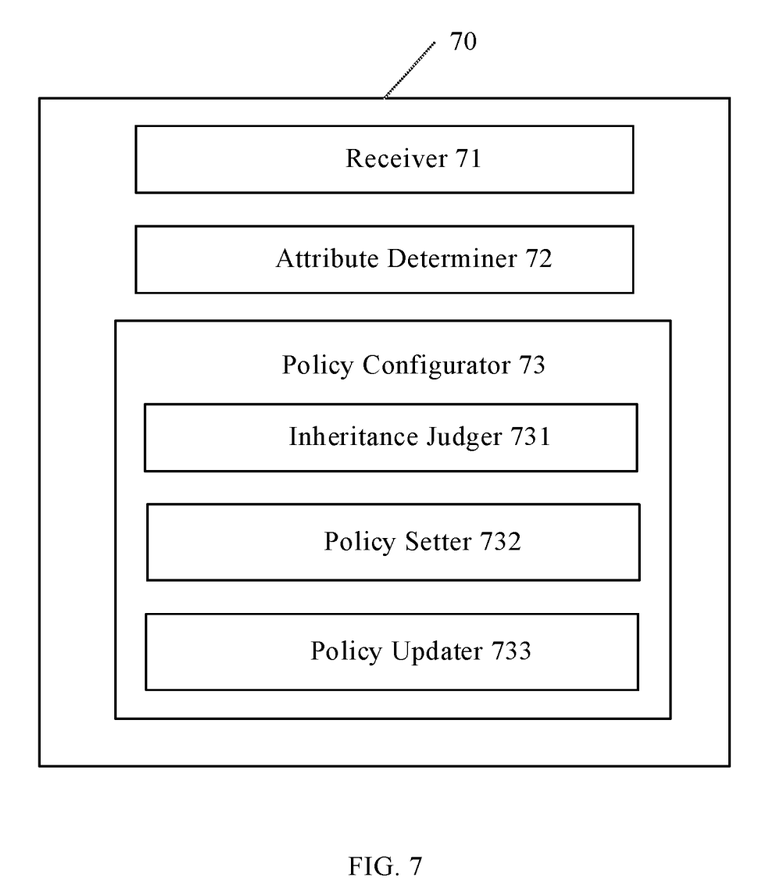
FIG. 7 is a structural block diagram of an embodiment of an apparatus of the present disclosure.

FIG. 7 shows a structural block diagram of an embodiment of an access control policy configuration apparatus of the present disclosure. As shown in FIG. 7, the access control policy configuration apparatus 70 comprises a receiver 71, an attribute determiner 72, and a policy configurator 73. The access control policy configuration apparatus 70 may be implemented as a CSE.

The receiver 71 is arranged to receive a request for creating a target resource. The receiver 71 may receive the request from an AE. The receiving may be done in a wire or wireless way. The request may be in a form of a resource creation message. The resource creation message may carry an attribute value of an access control policy inheritance attribute. Additionally, the resource creation message may carry an attribute value used for setting the access control policy identification attribute.

The attribute determiner 72 is arranged to determine, based on the request, whether an access control policy inheritance attribute is set for the target resource. The attribute determiner 72 may analyze the request so as to determine whether it comprises the attribute information related to the access control policy inheritance attribute. In an embodiment, the attribute determiner 72 may determine that the access control policy inheritance attribute is set for the target resource when the request comprises an inheritance field. In some embodiments, the attribute determiner 72 may send the attribute information related to the access control policy inheritance attribute included in the request to the policy configurator 73. Exemplarily, the attribute information may comprise an attribute value used for setting the access control policy inheritance attribute, i.e., an access control policy inheritance attribute value, contained in the inheritance field.

The policy configurator 73 is arranged to configure the access control policy of the target resource according to the determination result. The policy configurator 73 may configure the access control policy based on the access control policy inheritance attribute value from the attribute determiner 72.

In some embodiments, the policy configurator 73 may comprise an inheritance judger 731 and a policy setter 732. The inheritance judger 731 is arranged to judge whether the target resource inherits the access control policy of its parent resource based on the attribute value related to the access control policy inheritance attribute. The policy setter 732 is arranged to set the access control policy attribute of the target resource according to the judging result of the inheritance judger 731.

In an embodiment, if the attribute value of the access control policy inheritance attribute is a first set value, the inheritance judger 731 determines that the target resource is to inherit the access control policy of its parent resource. If the attribute value of the access control policy inheritance attribute is a second set value, the inheritance judger 731 determines that the target resource does not inherit the access control policy of the parent resource. If the attribute value of the access control policy inheritance attribute is a third set value, the inheritance judger 731 determines whether the target resource inherits the access control policy of the parent resource according to a preset setting rule. The preset setting rule indicates a default inheritance relationship between the access control policies of the target resource and its parent resource, and the default inheritance relationship may comprise inheritance or non-inheritance.

When the inheritance judger 731 determines that the target resource is to inherit the access control policy of its parent resource, the policy setter 732 sets the access control policy identification attribute of the target resource according to the access control policy identification attribute of the parent resource. When the inheritance judger 731 determines that the target resource does not inherit the access control policy of the parent resource, the policy setter 732 requests the application layer to formulate an access control policy identification attribute for the target resource.

In some embodiments, the attribute determiner 72 is arranged to analyze the request to determine whether a personalized access control policy identification attribute is set for the target resource. If the attribute determiner 72 determines that the personalized access control policy identification attribute is set for the target resource, the policy setter 732 adds the personalized access control policy identification attribute value to the access control policy identification attribute of the target resource.

In some embodiments, the policy configurator 73 may further comprise a policy updating unit 733. When the inheritance judger 731 determines the target resource is to inherit the access control policy of its parent resource and the access control policy of the parent resource of the target resource changes, for instance, when the access control policy identification information is added to, modified in, or deleted from the access control policy identification attribute of its parent resource, the policy updating unit 733 is arranged to update the access control policy identification attribute of the target resource according to a changed access control policy identification attribute of the parent resource. That is, the access control policy identification information may be added to, modified in, or deleted from the access control policy identification attribute of the target resource.

Figure 8:
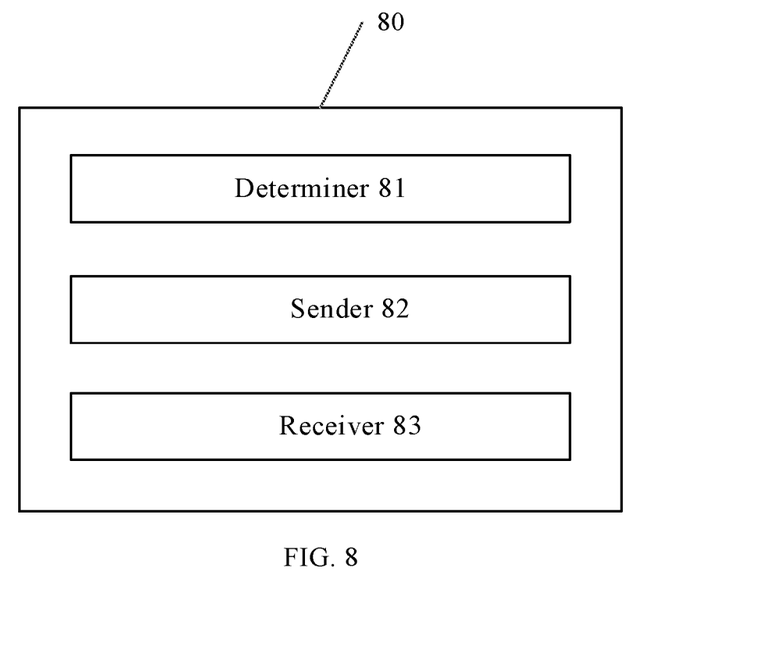
FIG. 8 is a structural block diagram of a further embodiment of an apparatus of the present disclosure.

FIG. 8 shows a structural block diagram of a further embodiment of an apparatus of the present disclosure. As shown in FIG. 8, the apparatus 80 comprises a determiner 81, a sender 82 and a receiver 83. The access control policy configuration apparatus 80 may be implemented as an AE.

The determiner 81 is arranged to determine an inheritance relationship between access control policies of a target resource and its parent resource. The sender 82 is arranged to send a request for creating the target resource. The request is provided with an access control policy inheritance attribute indicating the inheritance relationship so as to configure the access control policy of the target resource. The receiver 83 is arranged to receive a resource creation response to the request.

In an embodiment, the present disclosure provides an access control policy configuration system. The access control policy configuration system comprises a first entity and a second entity. The first entity is used to send a request for creating a target resource. In some embodiments, the first entity may comprise the apparatus 80 as described above with reference to FIG. 8. The second entity comprises the access control policy configuration apparatus 70 as described above with reference to FIG. 7. The first entity may be an AE and the like, and the second entity may be a CSE and the like.

Figure 9:
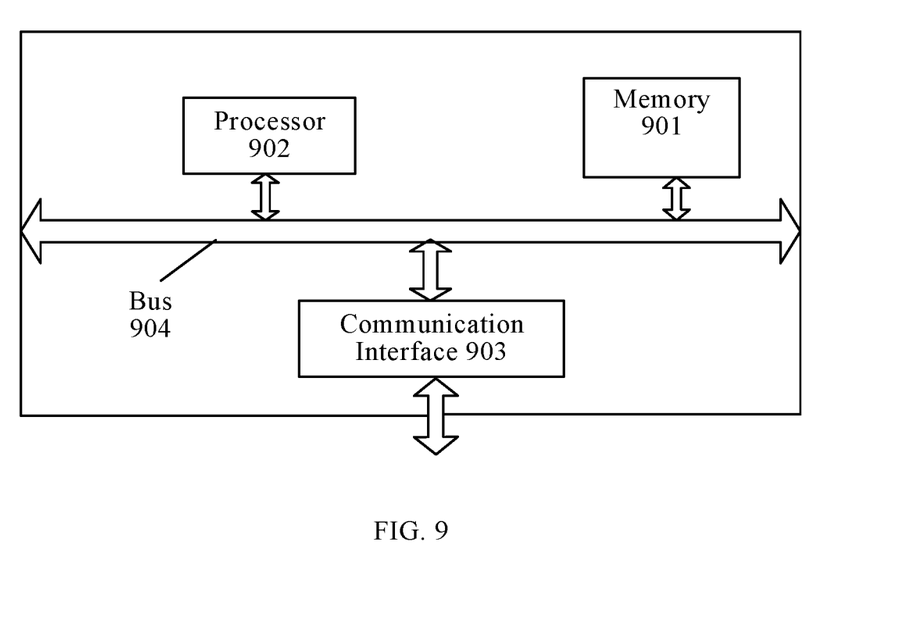
FIG. 9 is a structural block diagram of a still further embodiment of an apparatus of the present disclosure.

FIG. 9 is a structural block diagram of a further embodiment of an apparatus of the present disclosure. As shown in FIG. 9, there is provided an access control policy configuration apparatus implemented by a computing device. The computing device may be, for example, a server of a service provider, a device associated with a client (e.g., a client device), a system on a chip, and/or any other suitable computing device or computing system.

The apparatus may comprise a memory 901 and a processor 902. The memory 901 is configured to store instructions, and the processor 902 is coupled to the memory 901. The processor 902 is arranged to execute the instructions to implement the access control policy configuration method of any one of the above embodiments.

The apparatus may further comprise a communication interface 903 for communicating information with other devices. At the same time, the apparatus may further comprise a bus 904. The processor 902, the communication interface 903, and the memory 901 may communicate with each other through the bus 904.

The memory 901 represents a memory/storage device capacity associated with one or more computer-readable media. The memory 901 may comprise various types of memory units, such as a read-only memory (ROM), a random access memory (RAM), a dynamic RAM (DRAM), a dual data rate DRAM (DDRAM), a synchronous DRAM (SDRAM), a static RAM (SRAM), a programmable ROM (PROM), an erasable programmable ROM (EPROM), an electrically erasable programmable ROM (EEPROM), a flash memory, a polymer memory (such as a ferroelectric polymer memory, an ovonic memory, a phase-change or ferroelectric memory, a silicon-oxygen-nitrogen-oxygen-silicon (SONOS) memory), a magnetic or optical card, and any other type of media suitable for storing information.

The processor 902 may be a central processor CPU. The processor 902 may also comprise a dedicated integrated circuit implemented as hardware or other logic means formed of one or more semiconductors. Such hardware units are not limited by the materials from which they are formed or the processing mechanisms employed therein. For example, the processor 902 may comprise (one or more) semiconductor(s) and/or transistor(s) (e.g., an electronic integrated circuit (IC)).

In an embodiment, the present disclosure provides a computer-readable storage medium. Examples of the computer-readable storage medium may comprise one or more types of storage media capable of storing electronic data, including a volatile or non-volatile memory, a removable or non-removable memory, an erasable or non-erasable memory, a writable or rewritable memory, etc. The computer-readable storage medium stores a computer instruction that, when executed by a processor, causes the processor to implement the access control policy configuration method in any one of the above embodiments.

The access control policy configuration method, apparatus and system, as well as storage medium provided in the above embodiments may determine whether to inherit access policy permission of a parent resource according to an access control policy inheritance attribute so as to efficiently set and modify the access control policy of a child resource. Because it allows the user to configure and modify the access control policy by indicating an inheritance relationship, it improves the efficiency in configuring and modifying the access control policy, and improves the related standards of the existing access control policy.

Generally, any of the functions described herein can be implemented using software, firmware, hardware (e.g., a fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the access control policy configuration described above are platform-independent, meaning that the techniques may be implemented on a variety of commercial computing platforms having a variety of processors.

Although the present disclosure has been described in connection with various exemplary embodiments, those of ordinary skill in the art will understand that many modifications can be made thereto within the scope of the appended claims. Therefore, the scope of the present disclosure is not limited to the above description in any way, but should be determined with full reference to the appended claims.

The invention claimed is:

1. A method for configuring an access control policy of a target resource by a Common Service Entity in an Internet of Things, comprising:
   receiving from an Application Entity in the Internet of Things a request for creating the target resource;
   determining, based on the request, whether an access control policy inheritance attribute is set for the target resource in the request, wherein the access control policy inheritance attribute indicates an inheritance relationship between access control policies of the target resource and its parent resource; and
   configuring the access control policy of the target resource according to a result of the determination, wherein said configuring includes setting an access control policy identification attribute of the target resource according to an extracted access control policy inheritance attribute value during creation of the target resource when the access control policy inheritance attribute value is extracted from the request.

2. The method according to claim 1, wherein the configuring the access control policy of the target resource according to the result of the determination comprises:
   judging, based on an attribute value of the access control policy inheritance attribute, whether the target resource inherits the access control policy of its parent resource if the access control policy inheritance attribute is set for the target resource; and
   configuring the access control policy of the target resource according to a result of the judgement.

3. The method according to claim 2, wherein the judging whether the target resource inherits the access control policy of its parent resource comprises:
   determining that the target resource is to inherit the access control policy of the parent resource when the attribute value of the access control policy inheritance attribute is a first set value;
   determining that the target resource does not inherit the access control policy of the parent resource when the attribute value of the access control policy inheritance attribute is a second set value; and
   determining whether the target resource inherits the access control policy of the parent resource according to a preset setting rule, when the attribute value of the access control policy inheritance attribute is a third set value.

4. The method according to claim 3, wherein the configuring the access control policy of the target resource comprises:
   setting the access control policy identification attribute of the target resource according to the access control policy identification attribute of the parent resource when it is determined that the target resource is to inherit the access control policy of the parent resource;
   determining the access control policy identification attribute used for the target resource when it is determined that the target resource does not inherit the access control policy of the parent resource, wherein the determining the access control policy identification attribute used for the target resource comprises formulating the access control policy identification attribute used for the target source, or requesting a further entity to formulate the access control policy identification attribute used for the target resource; and
   wherein the preset setting rule indicates a default inheritance relationship between the access control policies of the target resource and its parent resource, the default inheritance relationship comprising inheritance or non-inheritance.

5. The method according to claim 1, further comprising:
   determining, based on the request, whether a personalized access control policy identification attribute value is set for the target resource; and
   adding the personalized access control policy identification attribute value to the access control policy identification attribute of the target source in response to the personalized access control policy identification attribute value being set for the target resource.

6. The method according to claim 1, further comprising:
   updating the access control policy identification attribute of the target resource according to a changed access control policy identification attribute of the parent resource in response to a detected change of the access control policy identification attribute of the parent resource, when the target resource has been created and the attribute value of its access control policy inheritance attribute indicates that the target resource is to inherit the access control policy of the parent resource.

7. The method according to claim 5, wherein the request is in a form of a resource creation message, and the method comprises extracting the attribute value of the access control policy inheritance attribute and/or the personalized access control policy identification attribute value from the resource creation message.

8. The method according to claim 1, further comprising:
   configuring the access control policy of the target resource based on a default policy configuration rule in response to no access control policy inheritance attribute being set for the target resource.

9. The method according to claim 1,
   further comprising sending, after configuring the access control policy of the target resource, to the Application Entity a resource creation response to the request.

10. An apparatus for configuring an access control policy of a target resource in a Common Service Entity in an Internet of Things, comprising:
    a receiver arranged to receive from an Application Entity in the Internet of Things a request for creating the target resource;
    an attribute determiner arranged to determine, based on the request, whether an access control policy inheritance attribute is set for the target resource in the request, wherein the access control policy inheritance attribute indicates an inheritance relationship between access control policies of the target resource and its parent resource; and
    a policy configurator arranged to configure the access control policy of the target resource according to a result of the determination, including setting an access control policy identification attribute of the target resource according to an extracted access control policy inheritance attribute value during creation of the target resource when the access control policy inheritance attribute value is extracted from the request.

11. The apparatus according to claim 10, wherein the policy configurator comprises:
- an inheritance judger arranged to, in response to the access control policy inheritance attribute being set for the target resource, judge whether the target resource inherits the access control policy of its parent resource based on the attribute value of the access control policy inheritance attribute; and
- a policy setter arranged to set the access control policy of the target resource according to a result of the judgement.

12. The apparatus according to claim 11, wherein
the inheritance judger is arranged to determine that the target resource is to inherit the access control policy of the parent resource when the attribute value of the access control policy inheritance attribute is a first set value, determine that the target resource does not inherit the access control policy of the parent resource when the attribute value of the access control policy inheritance attribute is a second set value, and determine whether the target resource inherits the access control policy of the parent resource according to a preset setting rule when the attribute value of the access control policy inheritance attribute is a third set value.

13. The apparatus according to claim 12, wherein the policy setter is arranged to set the access control policy identification attribute of the target resource according to the access control policy identification attribute of the parent resource when it is determined that the target resource is to inherit the access control policy of the parent resource; determine an access control policy identification attribute to be used for the target resource by formulating the access control policy identification attribute to be used for the target source or requesting a further entity to formulate the access control policy identification attribute used for the target resource when it is determined that the target resource does not inherit the access control policy of the parent resource, and wherein the preset setting rule indicates a default inheritance relationship between the access control policies of the target resource and its parent resource, and the default inheritance relationship comprises inheritance or non-inheritance.

14. The apparatus according to claim 10, wherein the attribute determiner is arranged to determine, based on the request, whether a personalized access control policy identification attribute value is set for the target resource, and the policy setter is arranged to add the personalized access control policy identification attribute to the access control policy identification attribute of the target source in response to the personalized access control policy identification attribute value being set for the target resource.

15. The apparatus according to claim 10, wherein the policy configurator further comprises a policy updater arranged to, when the target resource is created and the attribute value of its access control policy inheritance attribute indicates that the target resource is to inherit the access control policy of the parent resource, update the access control policy identification attribute of the target resource according to a changed access control policy identification attribute of the parent resource in response to a detected change of the access control policy identification attribute of the parent resource.

16. The apparatus according to claim 14, wherein the request is in a form of a resource creation message, and the attribute determiner is arranged to extract the attribute value of the access control policy inheritance attribute from the resource creation message, or extract the attribute value of the access control policy inheritance attribute and the personalized access control policy identification attribute value from the resource creation message.

17. The apparatus according to claim 10, wherein the policy setter is arranged to, in response to no access control policy inheritance attribute being set for the target resource, configure the access control policy of the target resource based on a default policy configuration rule.

18. An apparatus for configuring an access control policy of a target resource in an Application Entity in an Internet of Things, comprising:
- a determiner arranged to determine an inheritance relationship between access control policies of the target resource and its parent resource;
- a sender arranged to send to a Common Service Entity in the Internet of Things a request for creating the target resource, in which request an access control policy inheritance attribute is set to indicate the inheritance relationship to be used for configuration of the access control policy of the target resource; and
- a receiver arranged to receive a resource creation response to the request, wherein said resource creation response comprises details of resource creation by the Common Service Entity, which resource creation includes that said Common Service Entity sets an access control policy identification attribute of the target resource according to the access control policy inheritance attribute value set in the request during creation of the target resource.

19. A computing device for configuring an access control policy, comprising:
- a memory configured to store executable instructions; and
- a processor coupled to the memory and configured to execute the executable instructions to perform the method according to claim 1.

20. A non-transitory computer-readable storage medium storing computer program instructions that, when executed by one or more processors, causes the processor to perform the method according to claim 1.

* * * * *